United States Patent
Dahlberg

(10) Patent No.: US 7,241,531 B2
(45) Date of Patent: Jul. 10, 2007

(54) BATTERY AND A BATTERY ENCAPSULATION

(75) Inventor: Kenneth Dahlberg, Stockholm (SE)

(73) Assignee: St. Jude Medical AB, Jarfalla (SE)

( * ) Notice: Subject to any disclaimer, the term of this patent is extended or adjusted under 35 U.S.C. 154(b) by 393 days.

(21) Appl. No.: 10/488,291

(22) PCT Filed: Jun. 17, 2002

(86) PCT No.: PCT/SE02/01178

§ 371 (c)(1),
(2), (4) Date: Sep. 7, 2004

(87) PCT Pub. No.: WO03/019700

PCT Pub. Date: Mar. 6, 2003

(65) Prior Publication Data

US 2005/0019653 A1    Jan. 27, 2005

(30) Foreign Application Priority Data

Aug. 30, 2001    (SE)    .................................... 0102917

(51) Int. Cl.
*H01M 2/00* (2006.01)

(52) U.S. Cl. ...................................................... 429/163
(58) Field of Classification Search ................ 429/163, 429/185

See application file for complete search history.

(56) References Cited

U.S. PATENT DOCUMENTS 4,182,028 A    1/1980    Epstein et al. ............. 29/623.2
5,985,479 A   11/1999    Boolish et al. ................ 429/56

FOREIGN PATENT DOCUMENTS

EP    0 800 843    10/1997
WO    WO 92/10005   6/1982

*Primary Examiner*—Patrick Joseph Ryan
*Assistant Examiner*—Thomas H. Parsons
(74) *Attorney, Agent, or Firm*—Schiff Hardin LLP

(57) ABSTRACT

A battery unit has a battery encapsulation formed by first and second encapsulation parts joined by a weld along a weld zone, with a battery contained in the battery encapsulation between the first and second encapsulation parts. Either the battery has a recess exstending along the weld zone, or overlaping edges of the first and second encapsulation parts are bent away from the battery to form a recess. The recess provides a heating insulating space that protects the battery from damage during welding along the weld zone.

20 Claims, 1 Drawing Sheet

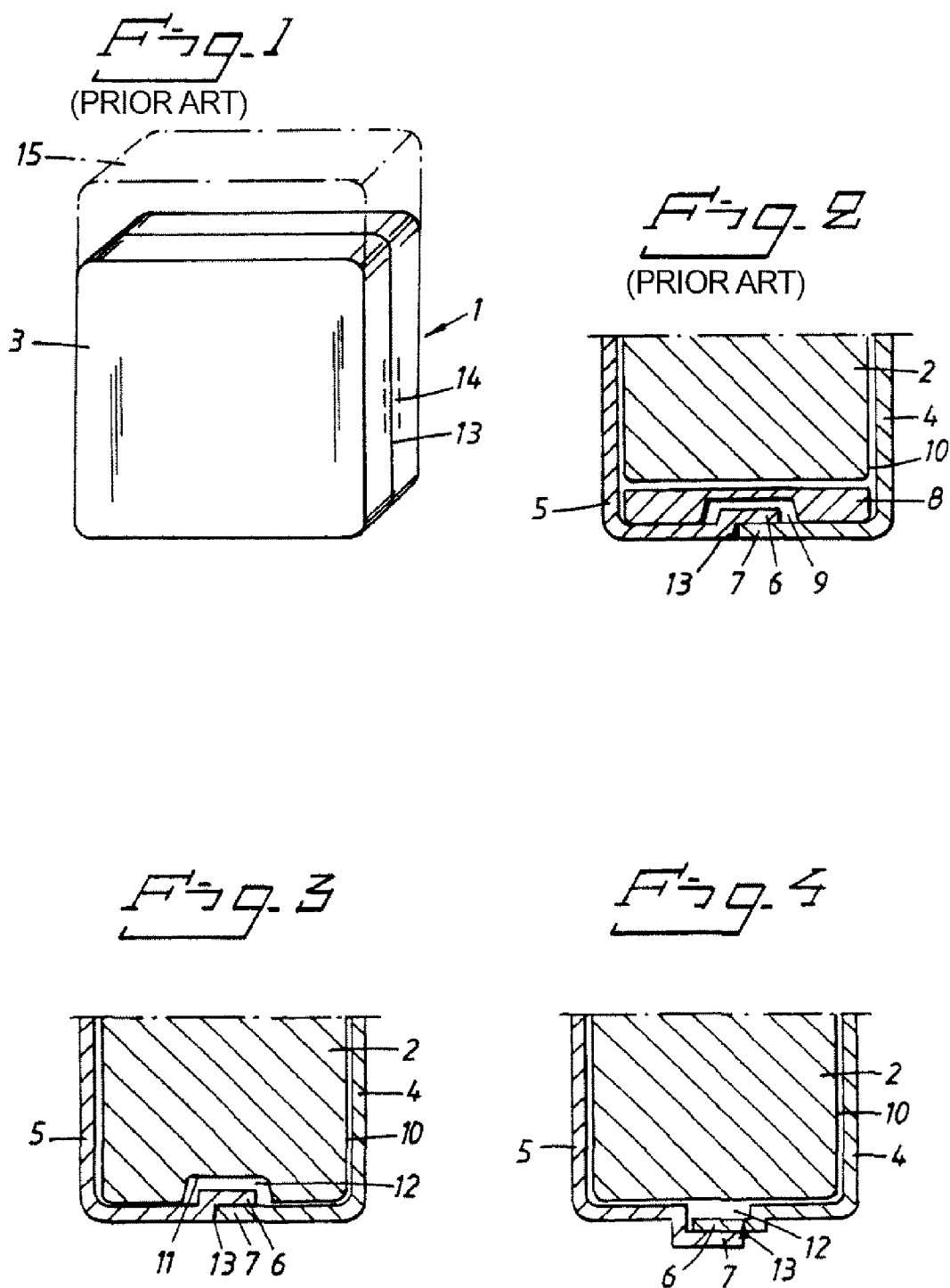

BATTERY AND A BATTERY ENCAPSULATION

BACKGROUND OF THE INVENTION

1. Field of the Invention

The present invention relates to a battery adapted to be located in a battery encapsulation, of the type having first and second encapsulation parts joined by a weld along a weld zone.

The invention also relates to such a battery encapsulation, and a battery unit having such a battery and such a battery encapsulation, the battery being located in the encapsulation.

The invention also relates to an implantable medical device that has such a battery unit. Typically, the implantable medical device is a heart stimulating apparatus.

It should be noted that the invention particularly relates to a battery unit, a battery and a battery encapsulation wherein the first and second encapsulation parts are joined by welding with the battery being disposed in the encapsulation, generally in its operative position in the encapsulation.

2. Description of the Prior Art

Since the invention is particularly applicable to batteries and battery units of implantable medical devices such as heart stimulating apparatuses the background of the invention is described with reference to such an application.

Batteries for implantable medical apparatuses are encapsulated in encapsulations made of a material compatible with the human body. Such materials are metals such as stainless steel or titanium.

The encapsulation is constituted of two or more parts that have to be joined with the battery positioned inside the encapsulation. Preferably the encapsulation parts are joined by means of welding along overlapping edges thereof.

Welding will result in heat being generated in the very vicinity of the battery itself. Normally, the battery is covered with an electrically insulating material, for example a polymer. The heat might negatively affect the battery or the insulating material covering it since the battery is located close to the weld during the welding.

The conventional way to solve this problem is to use a support element, usually a polymer structure, which separates the battery from the encapsulation in the weld region. The support element may have a recess opposite the weld, thereby providing a clearance between itself and the weld zone or weld region. The support element thus prevents heat transfer through conduction directly to the support element, and the battery. However, some space that could otherwise have been used as battery space is lost in the encapsulation due to the presence of the support element. The support element also adds cost to the battery unit.

SUMMARY OF THE INVENTION

It is an object of the present invention to provide a battery unit having a battery and a battery encapsulation of the type initially described that permits better use of space for the battery in the encapsulation than in known units, while at the same time permitting welding of the encapsulation parts with the battery in place without damaging the battery or any insulating material deposited thereon because of heat emanating from the weld.

It is a further object of the present invention to provide a battery unit having a battery and a battery encapsulation of the type initially described that is advantageous to manufacture from an economical point of view.

The above object is achieved by a battery of the type initially having a recess extending along a region corresponding to the weld zone, such that a heat insulating space is formed between the battery and the encapsulation along the weld zone.

The recess is located opposite to the weld zone, the depth and width of the recess being adapted such that heat emanating from the weld zone during welding does not have any detrimental effect on the battery.

According to a preferred embodiment, the battery is covered by an (electrically) insulating material, the depth and width of the recess being adapted such that heat emanating from the weld zone during welding does not have any detrimental effect on the insulating material.

The object of the invention is also achieved by a battery encapsulation of the type initially described, along the weld zone, portions of the first and second encapsulation parts are bent away from a battery located in the encapsulation such that a heat insulating space is formed between the battery and the encapsulation along the weld zone.

The aforementioned portions are bent away to such an extent that heat emanating from the weld zone during welding does not have a detrimental effect on the battery or any electrically insulating material deposited on the battery.

The aforementioned portions extend along the complete length of the weld zone, or at least the or those parts of the weld zone that face the battery.

In accordance with the above description, the invention also relates to a battery unit as initially described, having a battery according to the invention.

The invention also relates to an implantable medical device having a battery unit as described above. According to one embodiment the implantable medical device is a heart stimulating apparatus.

DESCRIPTION OF THE DRAWINGS

FIG. 1 is a perspective view showing a conventional battery unit.

FIG. 2 is a cross sectional view of a part of the battery unit of FIG. 1.

FIG. 3 is a cross sectional view of the same part of the battery unit shown in FIG. 1, but according to a first embodiment of the invention, FIG. 4 is a cross sectional view of a part of the same part of the battery unit shown in FIG. 1, but according to a second embodiment of the invention.

DESCRIPTION OF THE PREFERRED EMBODIMENTS

FIG. 1 shows a battery unit 1, a part of which is shown in a cross sectional view in detail, according to prior art.

Here, the battery unit 1 is part of an implantable medical device, more precisely a heart stimulating apparatus such as a pacemaker to be implanted in a mammal.

The battery unit 1 includes a battery 2 enclosed in an encapsulation 3 having first and second parts 4,5 that are joined by a weld 13, preferably accomplished by laser welding. The battery 2 occupies a part of the interior of the encapsulation 3, while another part of the encapsulation interior is occupied by electronics (not shown) for controlling the operation of the device. On top of the battery unit 1 and fixed thereto there is also provided a body 15, normally made of a transparent polymer, defining a connector body with connector elements (not shown) for the connection of leads to the battery 2.

The first and second parts 4,5 of the encapsulation 3 are joined along opposite edges 6,7 thereof. The edges 6,7 overlap each other along the weld 13. One edge 6 is displaced inwardly by a spacing corresponding to the thickness of the walls of the encapsulation parts 4. Thereby a generally flat outer periphery of the small sides of the encapsulation 3 is obtained, as well as an inner protuberance.

FIG. 2 shows a battery unit otherwise according to prior art, but which has a support element 8 for the battery 2 in the encapsulation 3. The support element 8 forms a spacer between the battery 2 and the encapsulation all along the weld zone. In the support element 8 there is provided a recess 9 opposite the weld zone 14 and extending over the length of the weld zone 14 that it faces. The support element 8 usually is made of a polymer. The recess creates a space between heat affected encapsulation 3 and battery 2 that prevents excessive heat transfer from the weld zone 14 to the battery 2 or any electrically insulating coating 10 on the battery 2 during welding.

The battery is made of metal, such as stainless steel, and the insulating coating material 10 is preferably a polymer such as silicon rubber, polypropylene (PP), polyfluorethylene or any other suitable electrically insulating material.

The encapsulation 3 preferably is made of a material accepted by the human body, such as titanium or stainless steel.

As an alternative to the battery unit 1 according to FIG. 2 it would also be possible to have a battery unit without any support element. Such a battery unit is shown in FIG. 3 but without further steps would have the disadvantage of excessive heat being transferred from the weld zone to the battery 2 during welding. The transferred heat may damage the battery 2 or any coating of electrically insulating material 10 provided thereon.

FIG. 3 shows a first embodiment of the inventive battery unit 1. Here, the battery 2 has a recess 11 extending along a region corresponding to the weld zone 14 adjacent the battery 2, such that a heat insulating space 12 is formed between the battery 2 and the encapsulation 3 along this part of the weld zone 14. Thereby excessive heat transfer is prevented from damaging the battery 2 or its insulation material 10. It is evident that only the part of the battery 2 that is facing the weld zone 14 need be provided with the recess 11. Normally, at least three out of the four of a generally flat, rectangular battery's small sides need to be provided with this recess. A recess is not necessary in the fourth small side of the battery that faces the electronics, if preferred from a production cost saving point of view.

The length of the recess 11 corresponds to the length of the part of the weld 13 that it faces. The depth of the recess 11 is such that an insulating space of 0.05 to 0.30 mm is obtained between the inner periphery of the weld zone 14 of the encapsulation 3 and the battery 2. One of the overlapping edges 6,7 is displaced inwards with a distance corresponding to the thickness of the encapsulation wall in order to provide a generally flat outer periphery along the joint between the encapsulation parts 4,5. Thereby, the actual depth of the recess in this embodiment is equal to the encapsulation wall thickness plus 0.05–0.30 mm.

The width of the recess is at least 0.2 to 0.6 mm larger than the width of the weld zone 14. Preferably, the width of the recess is 0.2–0.6 mm larger than the width of the overlapping edge 6 that protrudes inwards towards the battery 2. Thereby a preferred lateral spacing of 0.1 to 0.3 mm is created between battery 2 and encapsulation 3 on each side of the overlapping parts of the edges 6,7 or, more precisely, the protuberance formed by the inner edge 6.

FIG. 4 shows a second embodiment of the inventive battery unit 1. Here, the recess in the battery 2 has been replaced by a corresponding convexity of the edges 6,7 of the encapsulation. That is, the edges 6,7 are pre-bent before welding such that, with a conventional flat battery 2 inside the encapsulation 3, there will be an insulating space 12 between the battery 2 and inner periphery of the encapsulation along the weld zone 14.

The edges 6,7 are bent away from the interior of the encapsulation to such an extent that the heat insulating space thereby obtained has a width and a depth corresponding to the one mentioned above for the first embodiment.

It should be understood that the above embodiments have been disclosed only as an example, and that the invention is not restricted to these embodiments. A number of alternative embodiments will be apparent to those skilled in the art without departing from the inventive concept.

For example, in the first embodiment, the small sides of the encapsulation 3 that face the battery 2 protrude inwardly along the overlapping portions 6,7, whereby the heat insulating space between battery and enclosure is obtained thanks only to the provision of the recess in the battery. In the second embodiment, the heat insulating space is provided through the provision of the bent encapsulation edge portions 6,7, the small sides of the battery 2 directed thereto being generally flat (without recess). It should be understood that a combination of the first and second embodiments of the invention as described above is within the scope of the invention as long as the insulating space thereby created corresponds to that defined above for each individual embodiment.

The term "weld zone" as used herein refers to at least a region of the encapsulation located adjacent to the weld, the structure of which is visibly or at least physically altered due to the heat it is exposed to during welding.

Although modifications and changes may be suggested by those skilled in the art, it is the invention of the inventor to embody within the patent warranted heron all changes and modifications as reasonably and properly come within the scope of his contribution to the art.

I claim as my invention:

1. A battery adapted to be contained in a battery encapsulation having a seam closed by a weld along a weld zone, said battery comprising:
   a battery body adapted to be contained in said battery encapsulation; and
   said battery body having a recess extending along a region of said battery corresponding to said weld zone, said recess forming a heat insulating space between said battery body and said encapsulation along said weld zone.

2. A battery as claimed in claim 1 wherein said recess is disposed opposite said weld zone when said battery body is disposed in said battery encapsulation, and wherein said recess has a depth and a width selected to prevent heat emanating from said weld zone during welding of said seam from having a detrimental effect on said battery body.

3. A battery as claimed in claim 1 comprising insulating material covering said battery body, and wherein said recess covered by said insulating material has a depth and a width selected for preventing heat emanating from said weld zone during welding of said seam from having a detrimental effect on said insulating material.

4. A battery as claimed in claim 1 wherein said battery encapsulation has parts in said weld zone facing said battery body, said parts having a length, and wherein said recess has a length corresponding to said length of said parts.

5. A battery as claimed in claim 1 wherein said battery encapsulation has an interior periphery along said weld zone, and wherein said recess has a depth for maintaining a spacing between said battery body and said inner periphery in a range between 0.05 and 0.30 mm.

6. A battery as claimed in claim 1 wherein said weld zone has a width, and wherein said recess has a width that is larger than the width of said weld zone by an amount in a range between 0.2 and 0.6 mm.

7. A battery as claimed in claim 1 wherein said battery encapsulation has overlapping edges forming said seam that are welded together by said weld in said weld zone, said overlapping edges having a width, and wherein said recess has a width that is larger than said width of said overlapping edges by an amount in a range between 0.2 and 0.6 mm for producing a lateral spacing in a range between 0.1 and 0.3 mm between said battery body and said battery encapsulation on each side of said overlapping edges.

8. A battery encapsulation adapted to contain a battery therein, said battery encapsulation comprising:
   a first encapsulation part and a second encapsulation part;
   said first and second encapsulation parts being joined at a seam by a weld along a weld zone; and
   along said weld zone, each of said first and second encapsulation parts having a portion bent away from a battery contained in said first and second encapsulation parts, forming a heat insulating space between the battery and said first and second encapsulation parts along said weld zone.

9. A battery encapsulation as claimed in claim 8 wherein said portions of said first and second encapsulation parts are bent away for producing said heat insulating space with a size for preventing heat emanating from said weld zone during welding from having a detrimental effect on the battery.

10. A battery encapsulation as claimed in claim 8 wherein said battery is covered by an insulating material and wherein said portions of said first and second encapsulation parts are bent away for forming said heat insulating space with a size for preventing heat emanating from said weld zone during welding from having a detrimental effect on said insulating material.

11. A battery encapsulation as claimed in claim 8 wherein said weld zone has a weld zone portion facing said battery, and wherein said portions of said first and second encapsulation parts extend along said weld zone portion.

12. A battery encapsulation as claimed in claim 8 wherein said portions of said first and second encapsulation parts are bent away to form said heat insulating space with a depth in a range between 0.05 and 0.30 mm.

13. A battery encapsulation as claimed in claim 8 wherein said weld zone has a width, and wherein said portions of said first and second encapsulation parts are bent away for forming said heat insulating space with a width that is larger than said width of said weld zone by an amount in a range between 0.2 and 0.6 mm.

14. A battery unit comprising:
   a battery;
   a battery encapsulation comprising a first encapsulation part and a second encapsulation part joined at a seam by a weld along a weld zone, said battery being disposed in said battery encapsulation between said first and second encapsulation parts; and
   said battery having a recess extending along said weld zone and forming a heat insulating space between said battery and said battery encapsulation along said weld zone.

15. A battery unit as claimed in claim 14 wherein said recess is disposed opposite said weld zone, and wherein said recess has a depth and a width selected for preventing heat emanating from said weld zone during welding from having a detrimental effect on said battery.

16. A battery unit as claimed in claim 14 wherein said battery has a covering composed of an insulating material, and wherein said recess has a depth and width selected for preventing heat emanating from said weld zone during welding from having a detrimental effect on said insulating material.

17. A battery unit as claimed in claim 14 wherein said weld zone has a weld zone region facing said battery, said weld zone region having a length, and wherein said recess has a length corresponding to said length of said weld zone region.

18. A battery unit as claimed in claim 14 wherein said battery encapsulation has an interior periphery along said weld zone, and wherein said recess has a depth selected for producing a spacing between said interior periphery and said battery in a range between 0.05 and 0.30 mm.

19. A battery unit as claimed in claim 14 wherein said weld zone has a width, and wherein said recess has a width that is larger than said width of said weld zone by an amount in a range between 0.2 and 0.6 mm.

20. A battery unit as claimed in claim 14 wherein said first and second encapsulation parts have respective overlapping edges forming said seam that are welded together by said weld in said weld zone, said overlapping edges having a width, and said recess having a width that is larger than said width of said overlapping edges by an amount in a range between 0.2 and 0.6 mm, for producing a lateral spacing in a range between 0.1 and 0.3 mm between said battery and said battery encapsulation on each side of said overlapping edges.

* * * * *